(12) United States Patent
Burger

(10) Patent No.: US 9,314,135 B2
(45) Date of Patent: Apr. 19, 2016

(54) SPICE GRINDER

(71) Applicant: JOMA KUNSTSTOFFTECHNIK GmbH & CO. KG, Brunn am Gebirge (AT)

(72) Inventor: Josef Burger, Ravelsbach (AT)

(73) Assignee: JOMA Kunststofftechnik GmbH & Co. KG, Brunn Am Gebirge (AU)

( * ) Notice: Subject to any disclaimer, the term of this patent is extended or adjusted under 35 U.S.C. 154(b) by 120 days.

(21) Appl. No.: 13/975,525

(22) Filed: Aug. 26, 2013

(65) Prior Publication Data
US 2015/0053802 A1    Feb. 26, 2015

(30) Foreign Application Priority Data

Jul. 26, 2013    (EP) .................................... 13450034

(51) Int. Cl.
*A47J 42/38*    (2006.01)
*A47J 42/04*    (2006.01)

(52) U.S. Cl.
CPC .. *A47J 42/38* (2013.01); *A47J 42/04* (2013.01)

(58) Field of Classification Search
CPC ........... A47J 42/04; A47J 42/08; A47J 42/38; A47J 42/00; A47J 42/34; B65D 2213/00; B65D 39/084; B65D 2543/00992; B65D 51/18; B65D 41/00; B65D 41/04; B65D 41/0407; B65D 41/0428; B65D 41/0414; B65D 41/62; A47G 19/2272; F16J 13/12
USPC ................. 241/168, 169.1; 220/254.8, 254.1, 220/259.3, 256.1, 212; 215/228, 329, 316
See application file for complete search history.

(56) References Cited

U.S. PATENT DOCUMENTS

| 2,895,637 | A | * | 7/1959 | Bakke ..................... G01D 11/24 220/302 |
| 4,669,624 | A | | 6/1987 | Wiles |
| 6,085,920 | A | * | 7/2000 | Moretti ......................... 215/220 |
| 6,983,859 | B2 | * | 1/2006 | Azzarello .......... B65D 43/0274 215/216 |
| 7,878,437 | B2 | * | 2/2011 | Rice ........................... 241/189.1 |
| 2009/0050722 | A1 | * | 2/2009 | de Groote et al. ......... 241/169.1 |
| 2009/0134256 | A1 | * | 5/2009 | Rice ........................... 241/169.1 |
| 2010/0044485 | A1 | * | 2/2010 | Delbridge et al. ......... 241/169.1 |
| 2012/0097774 | A1 | * | 4/2012 | Hainbach ................... 241/101.2 |
| 2012/0286081 | A1 | | 11/2012 | Delbridge |

FOREIGN PATENT DOCUMENTS

EP    0571780 A    12/1993

* cited by examiner

*Primary Examiner* — Faye Francis
*Assistant Examiner* — Onekki Jolly
(74) *Attorney, Agent, or Firm* — Greenblum & Bernstein, P.L.C.

(57) ABSTRACT

A grinder has a jar having a surface provided with a screwthread. A grinding cap has a lower part engageable over the surface of the jar and provided with a screwthread such that the lower part can be screwed onto the jar and an upper part rotatable on the lower part. Grinding formations on the parts are effective on relative rotation of the parts. A ramp projects radially from the jar surface toward the cap surface, and a generally angularly extending and radially elastically deflectable arm has an inner end fixed on the cap surface and an outer end spaced in a relaxed condition of the arm radially outward from the cap surface toward the jar surface. The arm is oriented to engage and have its outer end deflected radially toward the cap surface by the ramp on screwing of the lower part onto the jar.

17 Claims, 2 Drawing Sheets

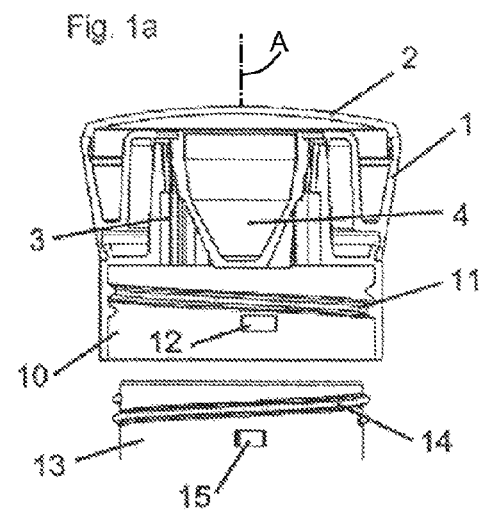
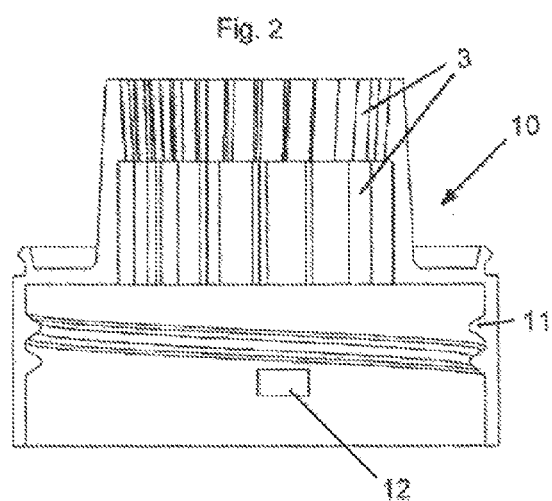
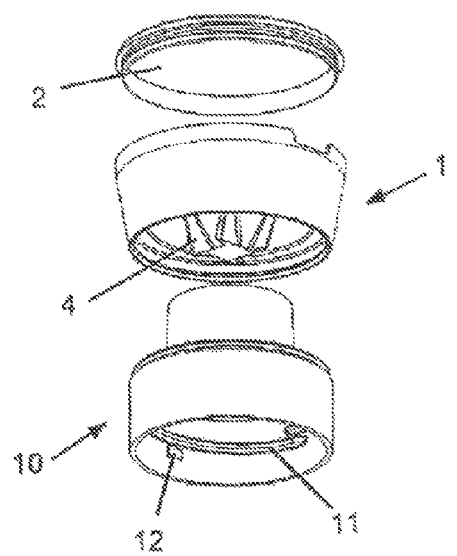
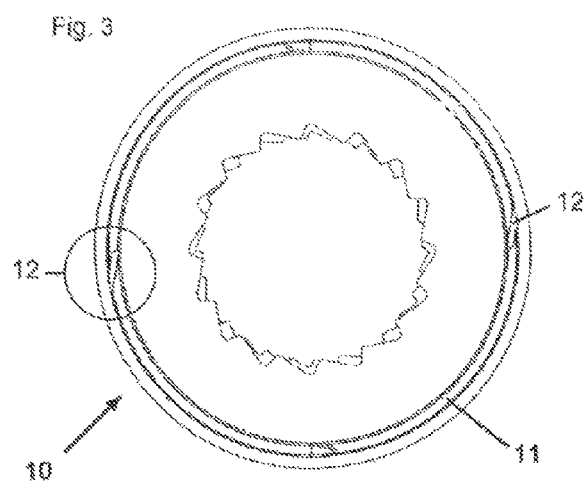

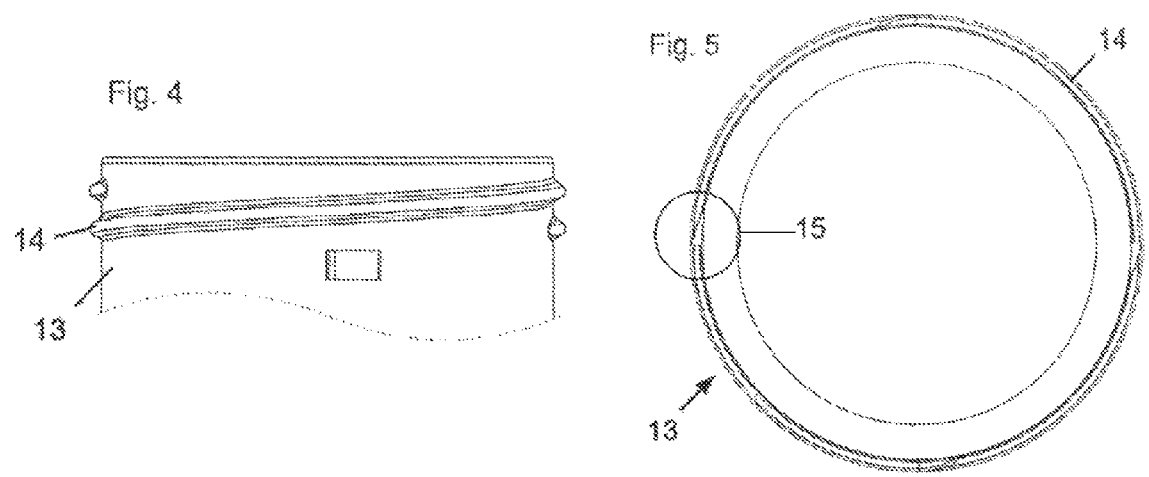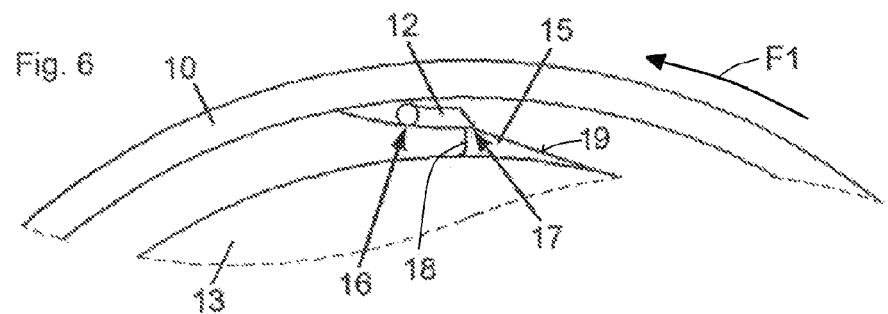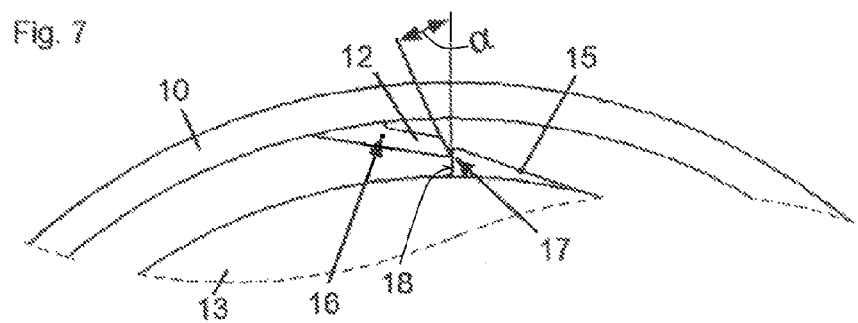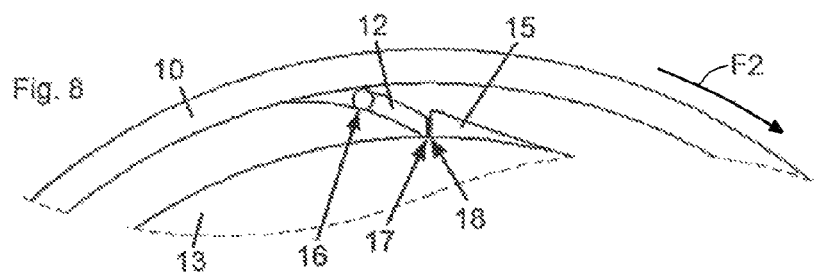

SPICE GRINDER

FIELD OF THE INVENTION

The present invention relates to a grinder. More particularly this invention concerns a spice grinder for culinary purposes.

BACKGROUND OF THE INVENTION

The invention relates to a spice grinder that can be screwed onto a jar containing a spice, where the jar has at least one outward projection that interacts in such a way with an inward projection or a part of the spice grinder that is to be screwed onto the jar so as to block any reverse rotation after the two projections have moved past each other as the spice grinder is screwed onto the jar.

It is frequently desirable or even necessary to close a container provided with a screw-type closure in such a way that the container can no longer be opened by turning the screw-type closure in the reverse direction. In this manner, inadvertent removal of the cap and spilling the contents is avoided. This is also true of glass spice containers onto which a spice grinder, typically of plastic, can be installed. These units involving a jar with a spice grinder built into the cap are disposable items, not intended for refilling.

Approaches have already been proposed for preventing the spice grinder from being unscrewed from the jar. These spice grinders have the features described above. For instance, US 2012/0286081 proposes providing complementary ramp or sawtooth shaped structures on the cap and on the jar, with their shallow and steep flanks oriented oppositely. The cap can be screwed on the shallow flanks of the formations meeting and sliding over one another with elastic deformation of the cap and/or jar when the cap is first screwed onto the jar. Once screwed on, reverse rotation of the cap on the jar will cause the two steep flanks to angularly flatly abut each other, thereby blocking removal of the cap.

Instead of the two ramp formation, U.S. Pat. No. 4,669,624 proposes one ramp formation coacting with another radially projecting ridge of uniform radial height. Similarly, EP 0,571, 780 proposes ramp-shaped formations on one of the screwthreads that cuts into the material of the other part and inhibits reverse rotation. The functioning is similar.

The problem with these systems is that substantial deformation of the jar neck and/or cap is necessary to screw the cap onto the jar. The deformation can damage the parts and also makes assembly of the product difficult.

Further, with this system the locking is not very strong. The ramps are designed for easy assembly, so that a hard reverse turn can overcome the ramps and unscrew the cap. Since the spice grinder is meant to be used by all types of people, a particularly strong person who reverse-turns the cap can damage the latch and free the cap. Furthermore, on small bottles, it is impossible to provide sufficiently large formations to adequately resist reverse rotation. On the other hand, large-mouth jars cannot be made flexible enough for the system to work effectively and typically require considerable torque to get the cap properly screwed onto the jar. The problem with large jars is that they must be gripped with considerable radially inwardly effective force, directly counter to the outward radial deflection needed to allow the ramps to pass each other, especially when the jar is of glass with no meaningful elasticity.

OBJECTS OF THE INVENTION

It is therefore an object of the present invention to provide an improved spice grinder.

Another object is the provision of such an improved spice grinder that overcomes the above-mentioned disadvantages, in particular that is easy to assemble, even for a large jar or other container, yet that very strongly resists unscrewing of the cap.

SUMMARY OF THE INVENTION

A grinder according to the invention has a vessel adapted to hold a material to be ground and having a surface centered on an axis and provided with a screwthread formation. A grinding cap therefore has a lower part engageable into or over the surface of the vessel and provided with a screwthread formation complementary to that of the vessel such that the lower part can be screwed to the vessel and an upper part rotatable about the axis on the lower part. Grinding formations on the parts are effective on relative rotation of the parts to grind the material in the vessel. In accordance with the invention a blocking formation projects radially from one of the surfaces toward the other surface, and a generally angularly extending and radially elastically deflectable arm has an inner end fixed on the other surface and an outer end spaced in a relaxed condition of the arm radially outward from the other surface toward the one surface. The arm is oriented to engage and have its outer end deflected radially toward the other surface by the blocking formation on screwing of the lower part onto the vessel.

Thus according to the invention when the spice-grinder cap is screwed on, the flexible arm easily slides over the projecting blocking formation on the jar, then snaps back and reliably blocks the grinder from turning in reverse.

The blocking formation according to the invention has, relative to a rotation direction of the cap relative to the vessel on screwing the cap onto the vessel, a downstream shallow flank and an upstream steep flank. The outer end of the arm is directly angularly juxtaposed with the steep flank after passing over the blocking formation on screwing of the cap onto or into the vessel.

In addition the outer end of the arm is flat and extends generally radially of the axis and parallel to the steep flank in the relaxed condition of the arm but extends at a small is acute angle to a radius from the axis on deflection by the blocking formation.

The arm is normally on the surface of the cap, which is typically made of plastic, and the blocking formation on the surface of the vessel, which is typically a glass jar. The arm is unitarily formed with the lower part.

BRIEF DESCRIPTION OF THE DRAWING

The above and other objects, features, and advantages will become more readily apparent from the following description, reference being made to the accompanying drawing in which:

FIG. 1a is a vertical section through a spice-grinder cap and jar according to the invention;

FIG. 1b is an exploded view of the grinder cap;

FIG. 2 is an axial section through the lower part of the cap;

FIG. 3 is a bottom view of the cap lower part of FIG. 2;

FIG. 4 is a large-scale side view of the jar neck according to the invention;

FIG. 5 is a top view of the jar cap; and

FIGS. 6, 7, and 8 are large-scale schematic bottom views indicating the interaction of the latch formations on the jar and cap as the cap is screwed onto the jar neck.

DETAILED DESCRIPTION OF THE INVENTION

As seen in FIGS. 1a and 1b a spice-grinder cap has a one-piece upper part 1 and a one-piece lower part 10, both typically injection molded of a hard but elastically deformable plastic and centered on an axis A. A cover 2 is releasably snap-fitted onto the upper part 1. The upper part 1 and lower part 10 are rotatable relative to each other about the axis A, and the lower part 10 can be secured by a radially inwardly open screwthread groove 11 onto a radially outwardly projecting screwthread ridge 14 of a neck of a jar 13. The lower part 10 is provided with teeth 3, while the upper part 1 is provided with teeth 4 that interact therewith to grind spices or similar material as is well known in the art by relative rotation of the two parts 10 and 11 about the axis A. Typically rotation in either direction is used for grinding in an oscillatory motion.

In use, the cover is removed, the jar 13 is turned upside down, and the two parts 1 and 10 are rotated relative to each other. Inverting the jar 3 dumps unground spices, e.g. peppercorns, from the jar 13 into the part 10, and relative rotation of the parts 1 and 10 causes the built-in grinder formed by the teeth 3 and 4 on the parts 10 and 1 to comminute the unground spices, that then drop out. This is all standard.

The embodiment according to the invention as described below is provided in order to prevent the spice grinder, in particular, the lower part 10, from being unscrewed from the jar 13 after it has been screwed on. Thus the user will not inadvertently unscrew the entire cap 1, 10 when using the grinder.

FIGS. 2 and 3 show that at least one, in the example, two inwardly projecting arms are provided diametrically opposite each other on the lower part 10 with the female screwthread formation 11. These arms 12 are elastically radially deflectable and interact with respective ramp-like or sawtooth projections 15 on the jar 13 that is provided with the screwthread formation 14. The outer free end of the arm 12 is radially offset from the inner end fixed to, and in fact unitary with, the part 10 so the outer arm can be elastically radially deflected relatively easily, yet the arm is very difficult to compress longitudinally. The arm 12 has a length extending from the surface-fixed end to the outer end and, in the illustrated example, the length of the arm is greater than a width of the arm.

It is also within the scope of the invention for the arm(s) 12 to be on the jar 13 and the projection(s) 15 on the cap part 10 RM. But because the jar 13 is typically made of glass and the part 10 of plastic, the illustrated embodiment with the arm 12 on the part 10 and the projection(s) 15 on the jar 13 is preferred. Further, the combination of the projection(s) 15, or blocking formations, and the elastically deflectable arm(s) 12 can be regarded as a blocking system that blocks counter-rotation of the jar, or other container, and the cap part 10.

FIGS. 6 through 8 are schematic views showing the interaction between one of the projections 15 and the respective arm 12 when the lower part 10 is screwed onto the jar 13, or when there is an attempt to unscrew it. As described below, each of the projections can be regarded to be a blocking formation, which has a shallow surface 19, or ramp or sliding surface, and a steep surface 18, the latter a blocking surface.

First, as shown in FIG. 6, when the lower part 10 is screwed in the direction of arrow F1 onto the jar 13, the flexible arm 12 moves past the ramp 19 of the blocking formation 15, flexing elastically radially outward, in an elastically biased state, about an imaginary pivot point 16 and sliding past the ramp 19. The arm 12 is pushed, or elastically biased, outward as its outer end slides over the shallow surface 19 of the blocking formation 15. As shown in FIG. 6, during rotation of the cap to fit and secure the lower part of the cap to the container, indicated by arrow F1, the non-fixed outer end of the arm is the trailing end of the arm, the fixed end being the leading end.

Then, as shown in FIG. 7 the flexible arm 12 snaps elastically back inward so that its outer end 17 angularly confronts the steep end face or blocking surface 18 of the blocking formation 15.

Subsequently, as shown in FIG. 8, an attempt to counter-rotate the part 10 in a direction F2 unscrewing it from the jar 13 will only force the end 17 into solid flat contact with the blocking surface 18, thereby solidly opposing unscrewing of the cap. The end 17 is planar and is beveled at an acute angle $\alpha$ relative to the radially extending face 18 to enhance/create a wedging effect and force the inner end 17 radially inward. As shown in FIG. 8, during counter-rotation of the cap, indicated by arrow F2, the non-fixed outer end of the arm is the leading end of the arm, the fixed end being the trailing end.

Numerous modifications are possible to dispose a plurality of circumferentially spaced-apart projections 15, or blocking formations, on the jar 13, and a plurality of circumferentially spaced-apart flexible arms 12 on the lower part 10. The dynamic principle according to the invention could also be applied to other containers that include a screw-type closure.

I claim:

1. A grinder comprising:
    a vessel designed to hold a material to be ground and having a vessel surface centered on an axis and provided with a screwthread formation; and
    a grinding cap having:
        a lower part engageable into or over the vessel surface and provided with a screwthread formation complementary to the formation of the vessel surface such that the lower part can be screwed to the vessel upon rotation of the lower part in relation to the vessel;
        an upper part rotatable on the lower part; and
        grinding formations on the upper and lower parts effective on relative rotation of the lower and upper parts to grind the material of the vessel;
    a blocking system that blocks counter-rotation of the lower part in relation to the vessel, said blocking system comprising:
        a blocking formation; and
        an elastically deflectable arm;
        the blocking formation and the elastically deflectable arm being fixed upon and extending from respective different ones of radially spaced-apart surfaces comprised of a surface of the lower part of the cap and a surface of the vessel;
        the elastically deflectable arm having a length extending between a surface-fixed end and a non-fixed outer end, the elastically deflectable arm being oriented to engage and have the outer end deflected by the blocking formation during screwing of the lower part of the cap onto the vessel.

2. The grinder defined in claim 1, wherein:
    the blocking formation has, relative to a rotation direction of the cap relative to the vessel on screwing the cap onto the vessel, a downstream shallow flank and an upstream steep flank, the outer end of the arm being directly angularly juxtaposed with the steep flank after passing over the blocking formation on screwing of the cap onto or into the vessel.

3. The grinder defined in claim 2, wherein:
    the outer end of the arm is flat and extends generally radially of the axis and parallel to the steep flank in a non-biased state of the arm but extends at a small acute angle to a radius from the axis on deflection by the blocking formation.

4. The grinder defined in claim 2, wherein:
the arm is on the surface of the lower part of the cap and the blocking formation on the surface of the vessel.

5. The grinder defined in claim 4, wherein:
the arm is unitarily formed with the lower part of the cap.

6. The grinder defined in claim 1, wherein:
the vessel is made of glass having substantially no elasticity.

7. The grinder defined in claim 1, wherein:
the length of the arm is greater than a width of the arm.

8. The grinder defined in claim 1, wherein:
the arm is a first arm and the blocking formation is a first blocking formation;
the grinder further comprises a second, duplicate, elastically deflectable arm and a second, duplicate, blocking formation, each circumferentially spaced from the first arm and the first blocking formation, respectively.

9. A grinder comprising:
a container designed to hold a material to be ground and having a screwthread formation extending around an axis of the container; and
a grinding cap comprising:
  a lower part designed to be fitted into or over the container and provided with a screwthread formation complementary to the formation of the container such that the lower part can be screwed to the container upon rotation of the lower part of the cap in relation to the container;
  an upper part rotatable on the lower part; and
  grinding formations on the upper and lower parts effective on relative rotation of the lower and upper parts to grind the material of the container;
a blocking formation projecting from a first surface and having a sliding surface and a blocking surface;
a radially elastically deflectable arm having an inner end fixed on a second surface;
the first surface is a surface of the container and the second surface is a surface of the lower part of the cap, or the first surface is a surface of the lower part of the cap and the second surface is a surface of the container;
the elastically deflectable arm having a length extending from the inner end to a non-fixed outer end; and
the arm being oriented such that, during rotation of the lower part of the cap in relation to the container, the outer end is elastically deflected by the sliding surface of the blocking formation in a direction away from the surface of the blocking formation and, during counter-rotation of the lower part of the cap in relation to the container, the outer end is blocked by the blocking surface of the blocking formation.

10. A grinder according to claim 9, wherein:
the outer end of the arm includes a flat surface that extends generally radially of the axis and parallel to the blocking surface in a non-biased state of the arm, and extends at an acute angle in relation to a radius from the axis in the deflected state.

11. A grinder according to claim 9, wherein:
the inner end of the arm is fixed to the surface of the lower part of the cap; and
the blocking formation projects from the portion of the container surface.

12. A grinder according to claim 11, wherein:
the arm is unitarily formed with the lower part of the cap.

13. A grinder according to claim 9, wherein:
the container is made of glass having substantially no elasticity.

14. A grinder according to claim 9, wherein:
the elastically deflectable arm has a length extending from the fixed end to the non-fixed outer end, the length of the arm being greater than a width of the arm.

15. A grinder according to claim 9, wherein:
in relation to rotation of the cap to secure the lower part of the cap to the container, the non-fixed outer end of the arm is a trailing end of the arm, and in relation to counter-rotation of the cap, the non-fixed outer end of the arm is a leading end.

16. A grinder defined in claim 9, wherein:
the arm is a first arm and the blocking formation is a first blocking formation;
the grinder further comprises a second, duplicate, elastically deflectable arm and a second, duplicate, blocking formation, each circumferentially spaced from the first arm and the first blocking formation, respectively.

17. A grinder defined in claim 1, wherein:
in relation to rotation of the closure to secure the lower part of the cap to the vessel, the non-fixed outer end of the arm is a trailing end of the arm, and in relation to counter-rotation of the lower part of the cap, the outer end of the arm is a leading end.

* * * * *